(12) United States Patent
     Nishioka (10) Patent No.: US 6,819,250 B2
(45) Date of Patent: Nov. 16, 2004

(54) OUT-OF-LIQUID SENSOR, AND LIQUID SUPPLY DEVICE USING SAME

(75) Inventor: Yuji Nishioka, Tokyo (JP)

(73) Assignee: JohnsonDiversey, Inc., Sturtevant, WI (US)

( * ) Notice: Subject to any disclaimer, the term of this patent is extended or adjusted under 35 U.S.C. 154(b) by 23 days.

(21) Appl. No.: 10/320,224

(22) Filed: Dec. 16, 2002

(65) Prior Publication Data

US 2003/0141467 A1 Jul. 31, 2003

(30) Foreign Application Priority Data

Dec. 20, 2001 (JP) .......................................... 2001-387928
Oct. 8, 2002 (JP) .......................................... 2002-295254

(51) Int. Cl.[7] .............................................. G08B 21/00
(52) U.S. Cl. ....................... 340/608; 340/612; 340/606; 73/1.73; 73/1.74; 73/290 R; 73/291; 73/303
(58) Field of Search .................................. 340/608, 606, 340/612, 618, 611, 619, 620; 250/577; 73/293, 294, 302, 303, 307, 306, 1.73, 1.74, 290 R, 291

(56) References Cited

U.S. PATENT DOCUMENTS

| 4,415,011 A | * | 11/1983 | Grant |
| 4,660,607 A | * | 4/1987 | Griffith et al. |
| 5,316,444 A | | 5/1994 | Wicnienski ..................... 417/2 |
| 5,693,020 A | | 12/1997 | Rauh .......................... 604/151 |
| 6,124,794 A | * | 9/2000 | Furber et al. ................ 340/623 |
| 6,333,512 B1 | * | 12/2001 | Wirthlin ...................... 250/577 |

FOREIGN PATENT DOCUMENTS

| JP | 60186762 | 9/1985 |
| JP | 2000-170663 | 6/2000 |
| JP | 2000-338115 | 12/2000 |

* cited by examiner

*Primary Examiner*—Jeffery Hofsass
*Assistant Examiner*—Eric Blount
(74) *Attorney, Agent, or Firm*—Neil E. Hamilton; Warren R. Bovee; Renee J. Rymarz (57) ABSTRACT

The present invention provides a highly universal out-of-liquid sensor that allows an out-of-liquid condition to be accurately detected for a long time, and provides a liquid supply device using the same. The out-of-liquid sensor 1, that is mounted in a liquid supply route for supplying a liquid to a predetermined location and forms a part of the liquid supply route, comprises a light-transmissive tubular body 2, the opening at one end of which is formed into a connecting section 4 capable of communicating with an upstream piping 16 of the liquid supply route, and the opening at the other end of which is formed into a connecting section 5 capable of communicating with a downstream piping 16' of the liquid supply route, and in which an internal bore section 6 communicating between the two connecting sections 4 and 5 is formed in the liquid-transmitting channel; and also comprises a photosensor 3 mounted on the tubular body 2, the detector 11 of the photosensor 3 being constructed to sense, through the light-transmissive wall surface of the tubular body 2, the presence or absence of a liquid flowing through the internal bore section 6.

6 Claims, 12 Drawing Sheets

OUT-OF-LIQUID SENSOR, AND LIQUID SUPPLY DEVICE USING SAME

BACKGROUND OF THE INVENTION

1. Field of the Invention

The present invention relates to an out-of-liquid sensor mounted in a liquid supply route, and a liquid supply device using the same.

2. Description of the Related Art

Methods commonly used to apply chemical solutions to treatment objects and to treat these objects entail supplying water, warm water, or another diluting solution to a treatment device; gradually supplying a concentrated chemical solution to the supply route; preparing a dilute chemical solution having a predetermined concentration and applying the solution to the treatment object, rater than supplying a diluted solution prepared in advance to the treatment device and applying the solution to the treatment object. There are also methods in which a diluting solution and a concentrated chemical solution are supplied in advance to a chemical solution storage tank, adjusted to a predetermined concentration, and applied to the treatment object, in which case the diluting solution and the concentrated chemical solution are automatically supplied to the chemical solution storage tank when the liquid level in the chemical solution storage tank decreases. With some treatments, it is sometimes the case that solely the chemical solution in the treatment solution is used up and gradually replenished. In such cases, a chemical solution supply device for continuously or intermittently supplying a chemical solution to a predetermined location in the treatment device is provided separately from the treatment device.

Examples of treatment devices provided with such chemical solution supply devices include automatic commercial dishwashers for washing dishes and the like; commercial washers and driers for cleaning clothing, blankets, and the like; treatment devices for dyeing, washing, and otherwise treating fabrics and other textile products; wastewater treatment devices for industrial wastewater and the like; scale inhibitor supply devices for cooling towers and the like; devices for replenishing fertilizer and the like for hydroponics; devices for washing automobiles, aircraft, and the like; devices for washing milking machines and other dairy machinery; devices for washing food products and foodstuffs; various types of washing devices in food processing plants and the like; washing devices for electronic components; washing devices for metalworking components, machines, and the like; and bottle washing devices for alcoholic beverages, drinks, and the like.

In such treatment devices, the chemical solution is usually supplied automatically, and the supply source (bottle or the like) and supply line are integrated with the treatment device, making it more difficult for the operator to frequently check on the remaining amount of the chemical solution, and creating a tendency whereby the system runs out of solution during treatment. In this case, optimal drug concentration is impossible to maintain if the discovery of the out-of-liquid condition is delayed, whereby the treatment becomes inadequate, considerable labor is required for reprocessing, and substantial amounts of water, gas, electricity, and other types of energy are expended to obtain warm water, resulting in low economic efficiency.

Arrangements adopted in view of this situation include those in which the chemical solution supply line is fitted with an out-of-liquid sensor, and a warning is immediately issued if the supply of the chemical solution is disrupted. Examples of such out-of-liquid sensors include pressure sensors in which the pressure inside a piping is commonly kept at a negative level, and the negative pressure is released if the bottle, that is supply source, becomes empty; and photosensors in which the refractive index of light varies depending on the presence of a liquid (see, for example, Patent Reference 1). In addition, it has recently been proposed to use out-of-liquid sensors in which a pair of electrodes is extended into a liquid conduit, and the out-of-liquid condition is accurately detected by directly measuring the electrical conductivity of the liquid (see, for example, Patent Reference 2).

[Patent Reference 1]
Japanese Patent Application Laid-open No. 2000-338115
[Patent Reference 2]
Japanese Patent Application Laid-open No. 2000-170663

However, such pressure sensors are disadvantageous in that they often malfunction and issue a warning when there is no out-of-liquid condition. In addition, most of the photosensors are mounted on the outside of a tube in a liquid supply line and are used to detect the presence or absence of a liquid in the tube. With this type of device, the sensor must be selected in accordance with the tube diameter or the type of liquid, and the sensitivity thereof must be adjusted, bringing about problems in terms of labor and cost.

Meanwhile, out-of-liquid sensors in which the electrical conductivity of liquids is measured directly are disadvantageous in that although no malfunctions occur in the initial period of installation, the electrodes in the sensors must still be periodically replaced because these electrodes come into direct contact with chemical solutions, and therefore become corroded or worn over time, resulting in reduced sensitivity. Another drawback is that these electrodes can be used solely with electrolyte-containing chemical solutions.

An object of the present invention, which was perfected in view of this situation, is to provide a highly universal out-of-liquid sensor that allows an out-of-liquid condition to be accurately detected for a long time, and to provide a liquid supply device using the same.

SUMMARY OF THE INVENTION

Provided in order to attain the stated object, the first aspect of the present invention is an out-of-liquid sensor which is mounted in a liquid supply route for supplying a liquid to a predetermined location, and which forms a part of the liquid supply route, comprising a light-transmissive tubular body, the opening at one end of which is formed into a connecting section capable of communicating with an upstream piping of the liquid supply route, and the opening at the other end of which is formed into a connecting section capable of communicating with a downstream piping of the liquid supply route, and in which an internal bore section communicating between the two connecting sections is formed in the liquid-transmitting channel; and also comprising a photosensor mounted on the tubular body; the detector of the photosensor functioning in such a way as to sense, through the light-transmissive wall surface of the tubular body, the presence or absence of a liquid flowing through the internal bore section.

According to the second aspect of the present invention, the out-of-liquid sensor of the first aspect has particular features whereby the photosensor is a transmissive photosensor, and the light-emitting section and light-receiving section thereof are embedded on the opposite sides of the internal bore section of the tubular body.

The third aspect of the present invention is an out-of-liquid sensor which is mounted on the lid of a liquid-filled container prepared as a liquid supply source for supplying a liquid to a predetermined location, and which forms a part of a liquid supply route extending from the liquid supply source, comprising a light-transmissive tubular body, the opening at one end of which is formed into a connecting section capable of communicating with a liquid suction piping for engaging an opening formed in the lid of the liquid-filled container and drawing out the liquid in the container, and the opening at the other end of which is formed into a connecting section capable of communicating with a downstream piping of the liquid supply route, and in which an internal bore section communicating between the two connecting sections is formed in the liquid-transmitting channel; and also comprising a photosensor mounted on the tubular body; wherein the detector of the photosensor functions in such a way as to sense, through the light-transmissive wall surface of the tubular body, whether there is a liquid flowing through the internal bore section.

According to the fourth aspect of the present invention, the out-of-liquid sensor of the third aspect has particular features whereby the photosensor is a transmissive photosensor, and the light-emitting section and light-receiving section thereof are embedded on the opposite sides of the internal bore section of the tubular body.

The fifth aspect of the present invention is a liquid supply device for supplying liquid to a predetermined location, comprising liquid delivery means for drawing a liquid from one end and discharging the liquid at the other end; a liquid suction piping, one end of which is connected to a liquid supply source, and the other end of which is connected to the suction side of the liquid delivery means; and a liquid discharge piping, one end of which is connected to the discharge side of the liquid delivery means, and the other end of which is connected to the predetermined location; wherein the out-of-liquid sensor according to the first aspect or the out-of-liquid sensor according to the second aspect is mounted in the liquid suction route between the liquid supply source and the suction side of the liquid delivery means via the liquid suction piping, or in the liquid discharge route between the discharge side of the liquid delivery means and the predetermined location via the liquid discharge piping; and predetermined warning means is set to be activated when the photosensor in the out-of-liquid sensor detects an absence of liquid in the internal bore section of the tubular body.

The sixth aspect of the present invention is a liquid supply device for supplying liquid to a predetermined location, comprising liquid delivery means for drawing a liquid from one end and discharging the liquid at the other end; a liquid suction piping, one end of which is connected to a liquid-filled container prepared as a liquid supply source, and the other end of which is connected to the suction side of the liquid delivery means; and a liquid discharge piping, one end of which is connected to the discharge side of the liquid delivery means, and the other end of which is connected to the predetermined location; wherein the out-of-liquid sensor according to the third or fourth aspect is mounted on the lid of the liquid-filled container; and predetermined warning means is set to be activated when the photosensor in the out-of-liquid sensor detects an absence of liquid in the internal bore section of the tubular body.

DESCRIPTION OF THE PREFERRED EMBODIMENTS

Embodiments of the present invention will now be described.

Figure 1:
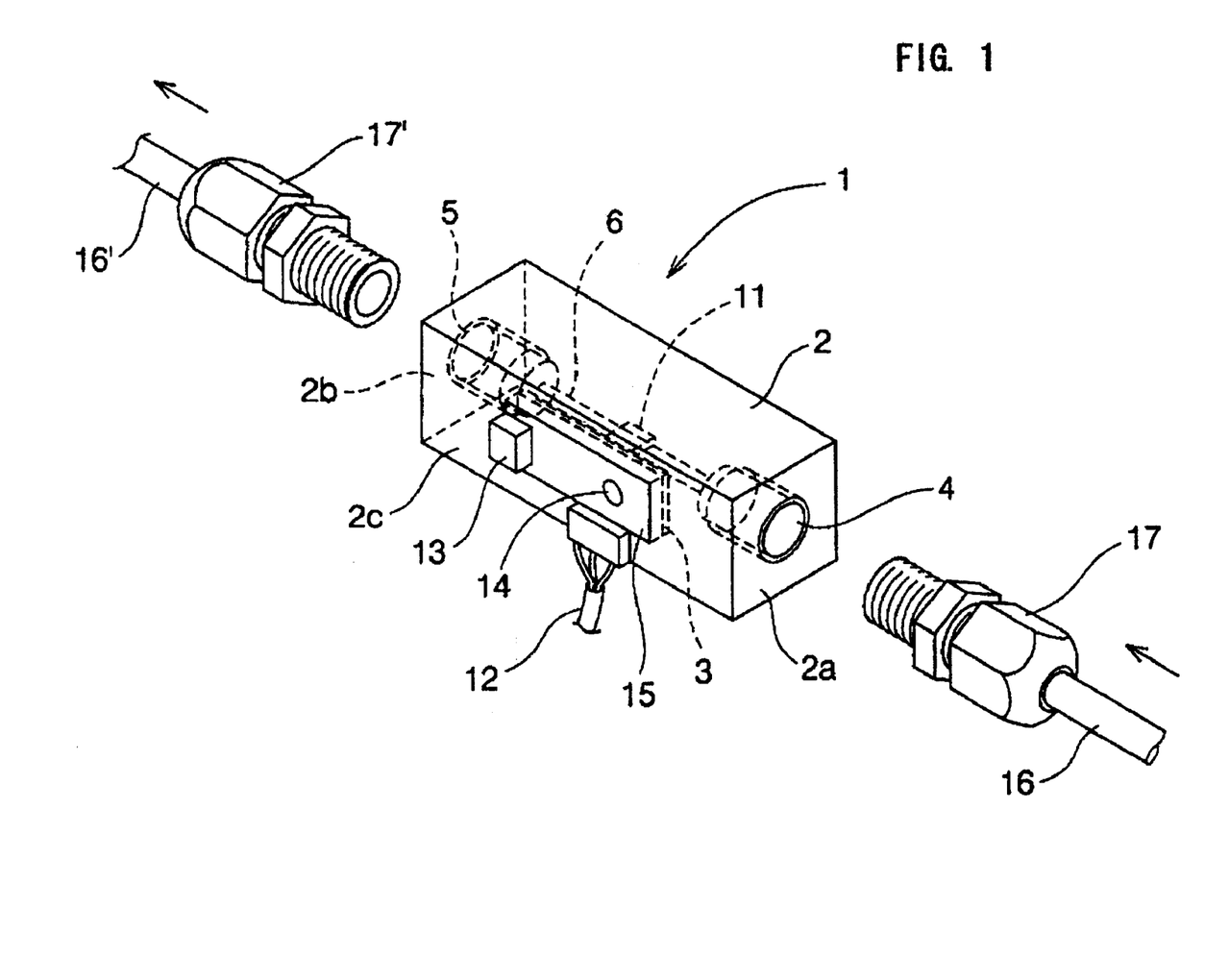
FIG. 1 is a diagram of an embodiment of the present invention.

An embodiment of the out-of-liquid sensor according to the present invention is depicted in FIG. 1. The out-of-liquid sensor 1 comprises a tubular body 2 made of polypropylene, and a photosensor 3 mounted on the lateral surface of the tubular body 2.

The tubular body 2 is shaped on the outside as a long rectangular body, and the two end faces 2a and 2b thereof are provided with connecting sections 4 and 5 composed of PT⅛-inch (1 inch=25.4 mm) female threads for forming a connection with a liquid supply line. The connecting sections 4 and 5 are connected together by a bore section 6 that has a minor diameter and extends longitudinally through the center of the tubular body 2.

Figure 2:
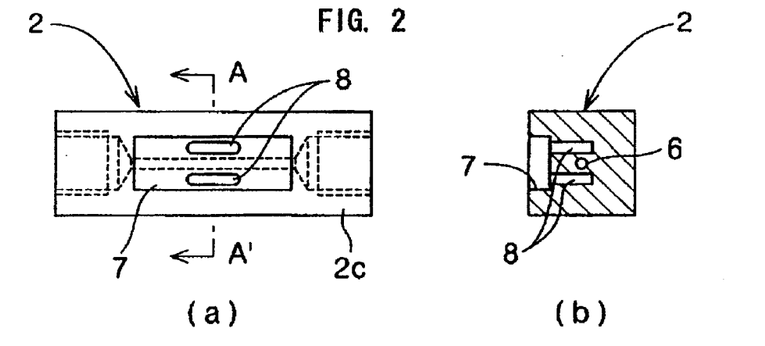
FIG. 2(a) is a front view of the tubular body used in the above embodiment.
FIG. 2(b) is a cross section through A-A' therein.

In addition, the front surface 2c of the tubular body 2 is provided with a relatively shallow concavity 7 with a rectangular shape when viewed in a plane, and a pair of concavities 8 disposed on both sides of the bore section 6 running through the center, as shown in FIG. 2(a) and in FIG. 2(b), which is a cross section through A-A' therein. The photosensor 3 is mounted using these concavities 7 and 8.

Figure 3:
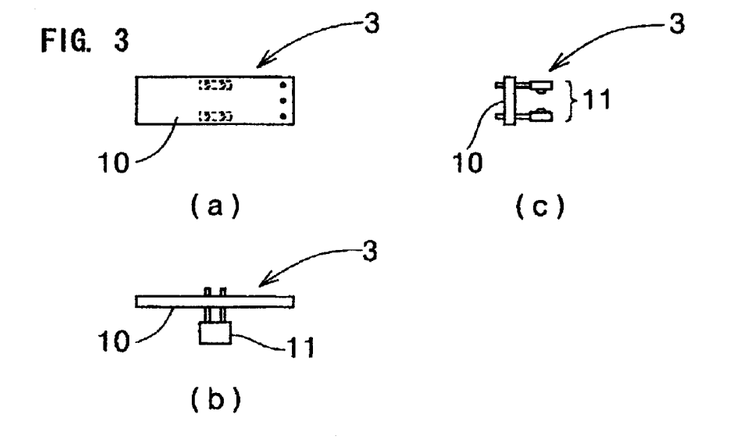
FIG. 3(a) is a front view of the photosensor used in the above embodiment.
FIG. 3(b) is a bottom view thereof.
FIG. 3(c) is a right-side view thereof.

The photosensor 3 comprises a rectangular base plate 10 and a detector 11 that protrudes on the reverse side of the base plate 10, as shown in the front view in FIG. 3(a), the bottom view in FIG. 3(b), and the right-side view in FIG. 3(c). The detector 11 comprises a light-emitting section and light-receiving section disposed facing each other at a predetermined interval. The photosensor 3 is brought into engagement with the tubular body 2 by a method in which the detector 11 comprising the light-emitting section and light-receiving section is inserted into the a pair of concavities 8 provided to the tubular body 2, and the base plate 10 is further fitted into the concavity 7. The photosensor 3 is also adapted to be integrated with the tubular body 2 by pouring a sealing resin into the concavity 7 in this state. A power wiring 12, a voice alarm 13, a flashing signal LED 14, and the like are also mounted on the base plate 10 (see FIG. 1). In addition, 15 in FIG. 1 is a resin layer.

The out-of-liquid sensor 1 can be arranged as part of the liquid supply route by connecting the left and right connecting sections 4 and 5, and the upstream piping 16 and downstream piping 16' of the liquid supply route by means of connectors 17 and 17'.

The out-of-liquid sensor 1 is configured such that the detector 11 of the photosensor 3 is inserted adjacent to the bore section 6 of the liquid-transmitting tubular body 2, and the light-emitting section and light-receiving section thereof are disposed on opposite sides of the bore section 6. It is therefore possible to determine whether the internal bore section 6 contains any liquid by projecting light from the light-emitting section of the detector 11, and temporally reading variations in the amount of light that passes through the walls of the light-transmissive tubular body and that is incident on the light-receiving section side. This type of operation is based on a principle in which the transmissivity of light traveling through the bore section 6 varies depending on the presence or absence of a liquid, as does the amount of light arriving to the light-receiving section. The sensor can operate with high accuracy irrespective of the type of liquid.

In the out-of-liquid sensor 1, the detector 11 does not come into direct contact with the liquid, so the detector 11 can satisfactorily operate for a long time without being corroded or abraded, in contrast to a conventional product whose electrodes are brought into direct contact with the liquid. In addition, detection accuracy is independent of the type of liquid being detected, making it possible to dispense with fine adjustments and other operations and to simplify the construction in comparison with conventional out-of-liquid sensors.

Connecting sections 4 and 5 for forming connections with the piping that constitutes the liquid supply route are also formed in the two end sections of the out-of-liquid sensor 1, making it possible to simplify connecting operations and to achieve a practical effect by connecting appropriate connectors or the like to the connecting sections 4 and 5 even when the line tube that constitutes the liquid supply route has arbitrary radial dimensions.

To yield a function whereby a liquid is continuously or intermittently supplied to a predetermined location, it is preferably that the out-of-liquid sensor 1 is adapted to a liquid supply device comprising liquid delivery means for drawing a liquid from one end and discharging the liquid at the other end; a liquid suction piping, one end of which is connected to a liquid supply source, and the other end of which is connected to the suction side of the liquid delivery means; and a liquid discharge piping, one end of which is connected to the discharge side of the liquid delivery means, and the other end of which is connected to the predetermined location. Examples include various types of liquid supply devices used to supply washing solutions, treatment solutions, and the like in various washing processes, processes for dyeing or otherwise treating textile products, processes for treating metalworking components, process for processing and treating food products, and the like. Particularly preferred among these are washing solution supply devices mounted on commercial-type automatic dishwashers.

Figure 4:
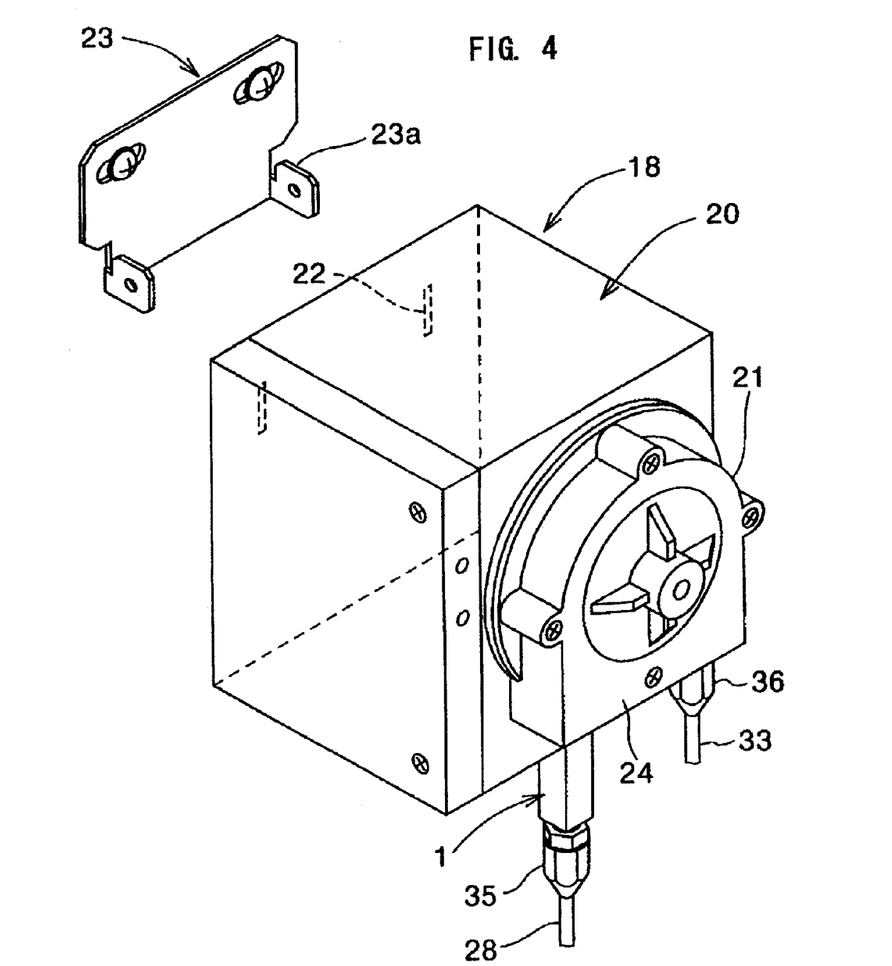
FIG. 4 is a diagram illustrating an embodiment in which the out-of-liquid sensor is incorporated into a liquid supply device.

FIG. 4 will now be used to describe a case in which the out-of-liquid sensor 1 is adapted to a washing solution supply device mounted on a commercial-type automatic dishwasher.

The washing solution supply device 18 comprises a main unit 20 and a pump unit 21, with long engagement slits 22 formed at two locations on the left and right sides of the reverse surface of the main unit 20. The washing solution supply device 18 is detachably mounted and held in place by adopting an approach in which the wall surface adjacent to the washing machine is utilized, a mounting attachment 23 such as the one shown in FIG. 4 is mounted at an appropriate location, and the engagement slits 22 of the washing solution supply device 18 are brought into engagement with the hooks 23a of the mounting attachment 23.

Figure 5:
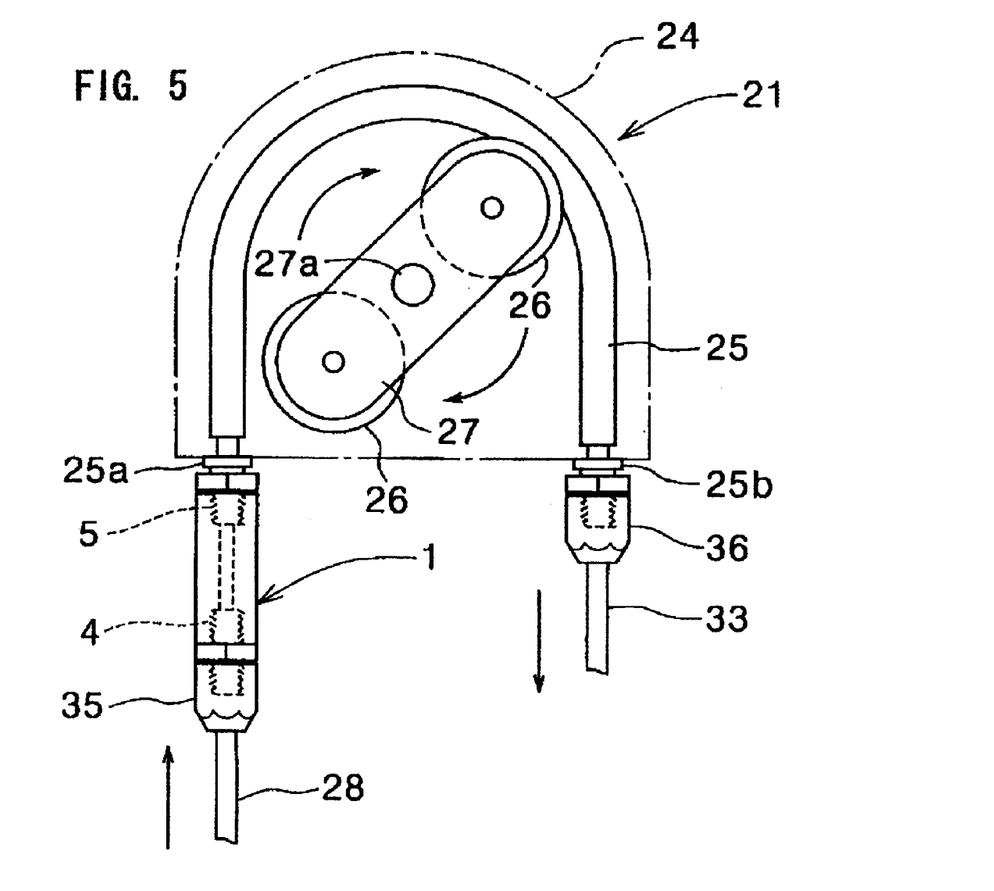
FIG. 5 is a diagram illustrating the operation of the liquid supply device.

The pump unit 21 of the washing solution supply device 18 comprises a transparent resin housing 24 (shown in the figure by a broken line), a U-shape pump tube 25 disposed in the interior, and a rotating arm 27 provided with rollers 26 rotatably supported on the two ends thereof, as shown in FIG. 5. A male thread is formed on the tip portion of an adapter 25a that protrudes downward from the end section on the suction side of the pump tube 25, and this portion is screwed to and connected with the connecting section 5 on one end of the out-of-liquid sensor 1. The connecting portion 4 on the other end of the out-of-liquid sensor 1 is connected to a concentrated detergent suction piping 28 via a connector 35.

At the same time, a adapter 25b that protrudes downward from the end section on the discharge side of the pump tube 25 is connected to a concentrated detergent supply piping 33 via a connector 36.

In further detail, the center axis 27a of the rotating arm 27 is rotatably actuated by a motor in the main unit 20, the two rollers 26 pivoted on the two ends of the rotating arm 27 rotate together with the rotation of the rotating arm 27 while being alternately pressed against the arcuate portions of the pump tube 25, and the concentrated detergent is drawn in from the concentrated detergent suction piping 28 via the out-of-liquid sensor 1 in the direction of the arrow, and is discharged on the opposite side, which is the side of the concentrated detergent supply piping 33. Consequently, the washing solution supply device 18 allows the concentrated detergent to be supplied simply and accurately to the concentrated detergent supply piping 33 in small portions with a prescribed timing by providing the motor in the main unit 20 with predetermined operation control.

Consequently, the photosensor 3 detects an out-of-liquid condition, a warning is sounded by the voice alarm 13 (see FIG. 1), and the LED 14 flashes when the source for supplying the concentrated detergent becomes empty or the like, and no detergent is introduced any longer into the out-of-liquid sensor 1 in the washing solution supply device 18. At this point, the operator stops the device, immediately replenishes the detergent, and restarts the device. The detergent can thus be supplied in a secure manner. It is thus possible to dispense with the need for preparing out-of-liquid sensors that have different dimensions, to use the out-of-liquid sensor 1 described above for all occasions, and to achieve economic efficiency by using connectors that are screwed into the female thread in the connecting sections 4 and 5 of the out-of-liquid sensor 1 when the out-of-liquid sensor 1 is used on a drying/conditioning agent supply device whose base structure is the same as that of the above device but whose piping diameter alone is smaller.

The material used for the tubular body 2 in the out-of-liquid sensor 1 should preferably range from semitransparent to transparent such that any light projected from the light-emitting section of the detector 11 can reach the light-receiving section in a satisfactory manner. It is preferable to use a material whose haze value (%), as determined in accordance with JIS K 7136: 2000 "Plastics: Determination of haze for transparent materials" (ISO 14782: 1999), is 40 or less. The material should preferably have high strength and high chemical resistance, and be readily moldable and have high dimensional accuracy because of considerations related to the manufacturing processes involved. Examples of materials suitable for the tubular body 2 include polyethylene resins, polypropylene resins, polyamide resins, polyacetal resins, polycarbonate resins, polyphenyl ether resins, polybutylene terephthalate resins, ultrahigh-molecular-weight polyethylene resins, polysulfone resins, polyether sulfone resins, polyphenylene sulfide resins, polyarylate resins, polyamide-imide resins, polyetherimide resins, polyether ether ketone resins, polyimide resins, polytetrafluoroethylene resins, and copolyester resins. Resins that satisfy the above conditions can be appropriately selected from among these, and polypropylene resins are preferred because of their strength, chemical resistance, optical transparency, molding properties, and durability. The haze value (%) of such polypropylene resins should preferably be set to 10–40, and in particular about 28%.

The connecting sections 4 and 5 for the tubular body 2 are not limited to the above-described shapes and can have any shape as long they are configured to be readily connectable with the liquid supply line. For example, the connecting sections 4 and 5 may be shaped as male threads protruding from the two end faces of the tubular body 2 when connectors provided with female threads are used.

There is no need to adopt a rectangular shape such as the one described in the above example for the entire shape of the tubular body 2, and a circular or hexagonal prismatic shape may, for example, be also acceptable for the external shape. It is also possible to adopt an arrangement in which solely the connecting sections at the two ends have a circular cylindrical shape, and the central portion has a prismatic shape.

The inside diameter of the internal bore section 6 formed in the tubular body 2 varies with the flow rate of the liquid being supplied, the type of liquid, viscosity, and the like, and is commonly set to 1.5–10 mm. It is particularly preferable to minimize the difference between the inside diameter of the tubular body 2 and the diameter of the line connected to the tubular body 2. Specifically, the inside diameter of the internal bore section 6 should be set to 1.5–5 mm, and particularly 2–3 mm, when a chemical solution for an automatic dishwasher is supplied. This is because setting the inside diameter to less than 1.5 mm causes the solution to accumulate and makes it difficult to clearly determine the out-of-liquid condition even when such a condition is created in the case of a detergent or other agent that has a high specific gravity and is designed for automatic dishwashers. Conversely, setting dimensions related to the inside diameter to greater than 5 mm creates the danger that the accuracy of detecting the out-of-liquid condition will decrease for chemical solutions supplied in small amounts, such as drying/conditioning agents for automatic dishwashers.

The photosensor 3 mounted on the tubular body 2 is not limited to the above example and can be configured in any way as long as the presence or absence of a liquid flowing through the internal bore section 6 can be detected. For example, a transmitting type was used in the above example, but a reflecting type may also be used. The structure for mounting the photosensor on the tubular body 2 can be appropriately designed in accordance with the sensor shape. In the above example, concavities 7 and 8 were provided and the photosensor 3 was fitted thereinto and sealed with resin, but no particular limits are imposed on the shape of the concavities. In addition, the detector 11 does not need to be fitted into the concavities 7 and 8, and can be mounted directly on the surface of the tubular body 2 as long as the tubular body 2 has high light transmissivity and can deliver an adequate detection performance.

In the above example, a voice alarm 13, flashing signal LED 14, or other element mounted on a base plate 10 was directly mounted on the tubular body 2, although it is also possible to mount the device on the main unit 20 of the washing solution supply device 18, on the main unit of a dishwasher, or at another location, instead of on the tubular body 2, in which a warning can be clearly perceived as a visual or audible signal. A buzzer, Patlite, optoelectronic display, or any other device can be used instead of the voice alarm 13 or LED 14 as the warning means.

To prevent the photosensor 3 from malfunctioning when it is determined by the photosensor 3 that there is no liquid in the internal bore section 6 of the tubular body 2, the out-of-liquid sensor 1 is set such that the warning means is actuated after the out-of-liquid condition has continued for a predetermined time for example, 0–5 seconds.

Figure 6:
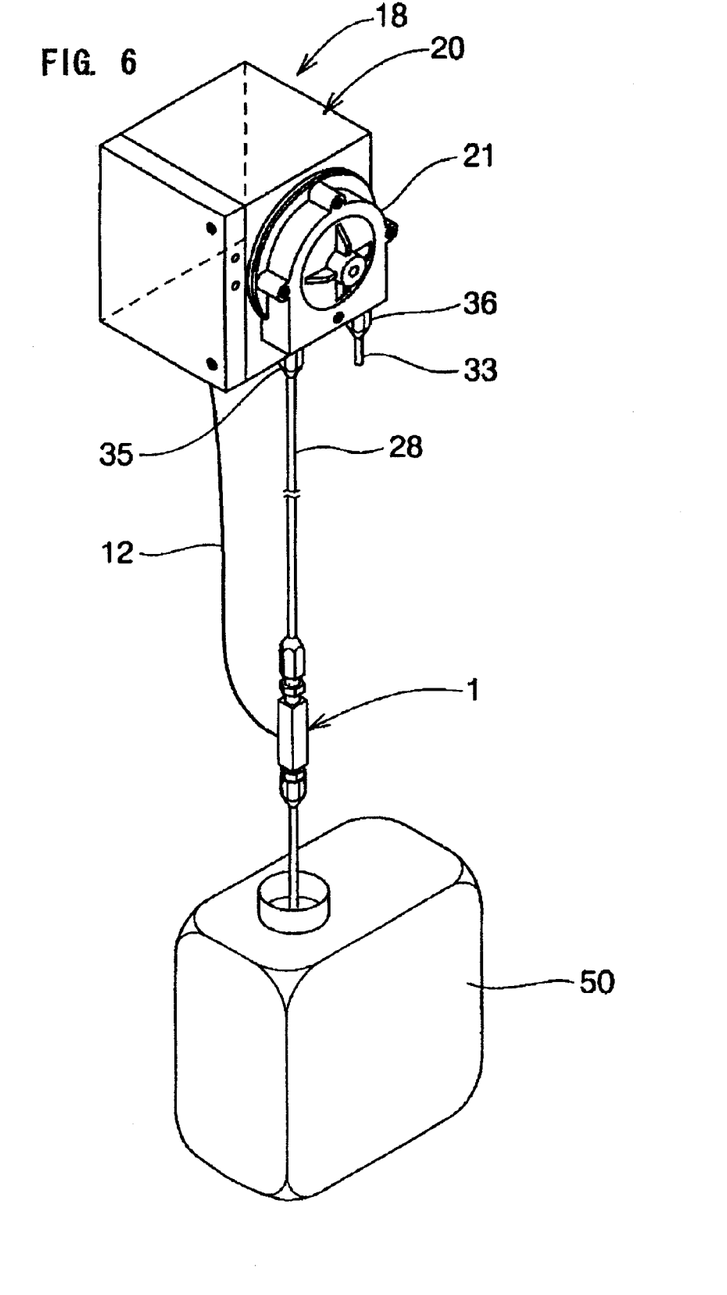
FIG. 6 is a diagram illustrating another embodiment in which the out-of-liquid sensor is incorporated into a liquid supply device.
Figure 7:
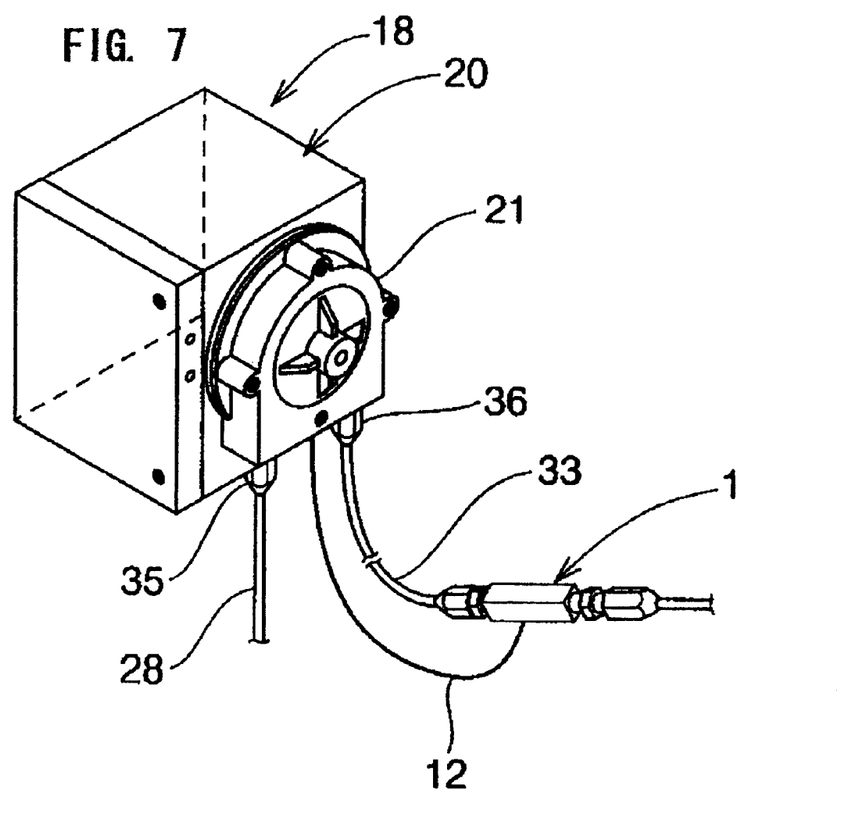
FIG. 7 is a diagram illustrating yet another embodiment in which the out-of-liquid sensor is incorporated into a liquid supply device.

When the out-of-liquid sensor 1 is adapted to a washing solution supply device for an automatic dishwasher in the same manner as in the above example, the out-of-liquid sensor 1 can be mounted on a chemical solution container 50, which is a chemical solution supply source for supplying a dishwasher detergent, a dishwasher drying/conditioning agent, or the like as shown, for example, in FIG. 6, making it possible to increase the accuracy with which the amount of the chemical solution remaining in the chemical solution container 50 is detected. It is also possible to accurately detect whether the chemical solution is accurately supplied to a dishwasher (not shown) by mounting the out-of-liquid sensor 1 in a chemical solution supply line 33, as shown in FIG. 7.

Figure 8:
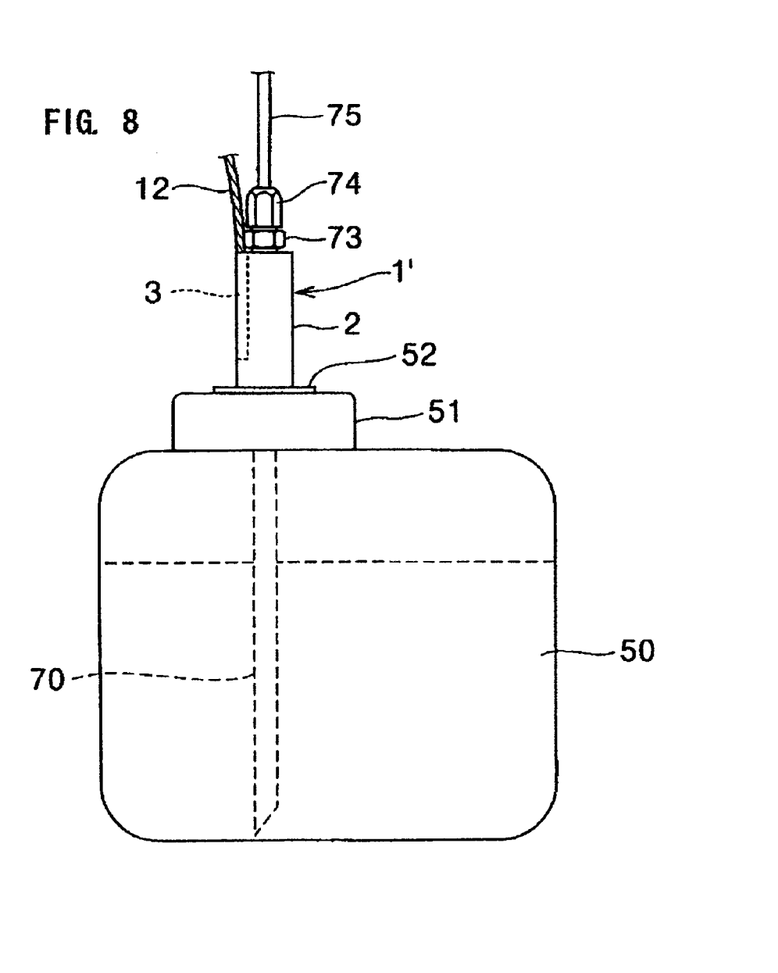
FIG. 8 is a diagram illustrating another embodiment of the present invention.

The out-of-liquid sensor of the present invention can also be mounted directly on a lid 51 fitted over the mouth of the chemical solution container 50, which is a washing solution supply source as shown in FIG. 8. In this case, the preferred practice is to close the mouth with an ordinary lid during the transportation and storage of the liquid container 50, and, before use, to replace this lid with a special lid 51 on which an out-of-liquid sensor 1' is mounted.

Figure 9:
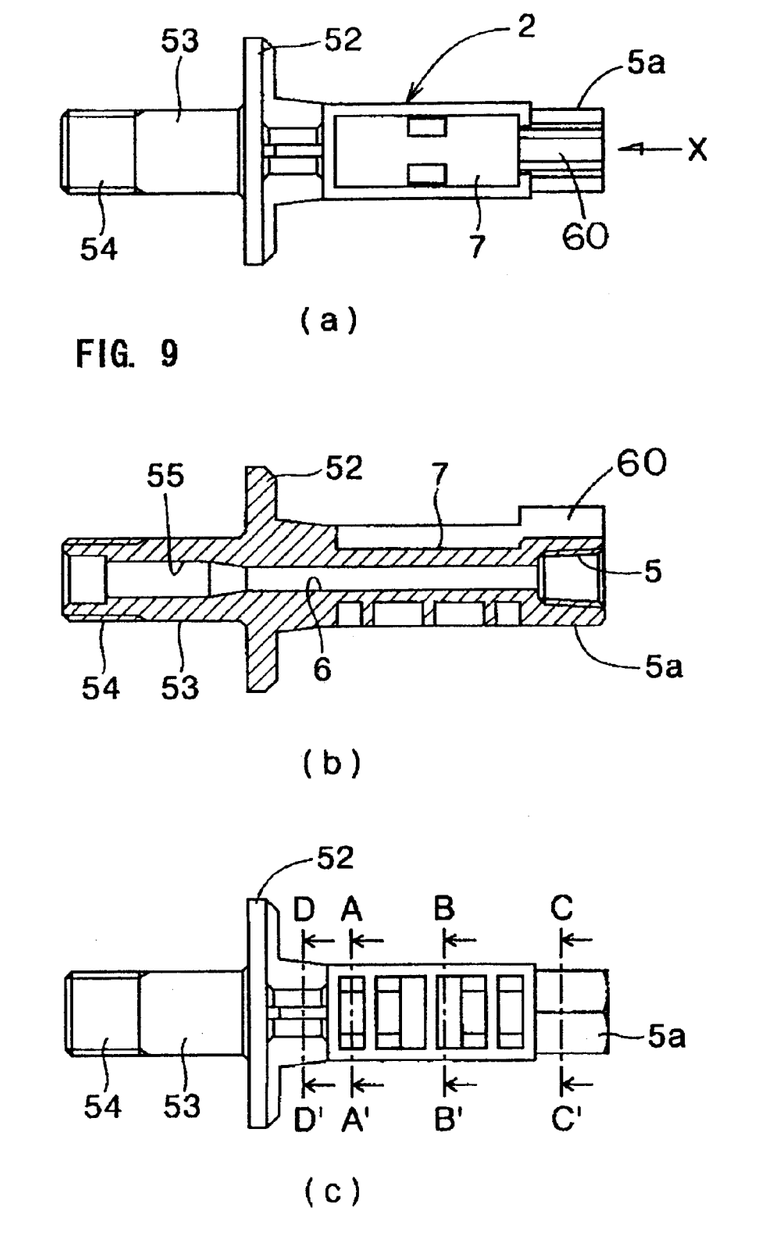
FIGS. 9(a), 9(b), and 9(c) are diagrams depicting the out-of-liquid sensors used in the above-mentioned other embodiment.
Figure 10:
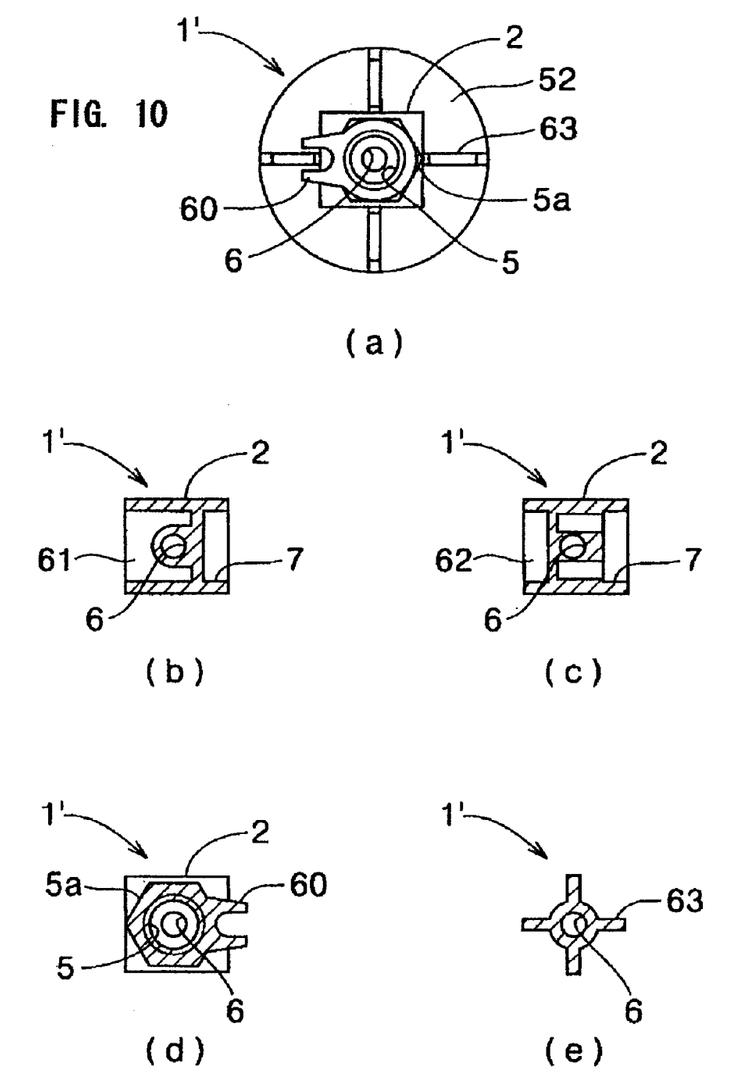
FIG. 10(a) is a view along arrow X in FIG. 9(a)
FIG. 10(b) is a cross section through A-A' in FIG. 9(c)
FIG. 10(c) is a cross section through B-B' in FIG. 9(c)
FIG. 10(d) is a cross section through C-C' in FIG. 9(c)
FIG. 10(e) is a cross section through D-D' in FIG. 9(c)

In preferred practice, the out-of-liquid sensor 1' used in the example shown in FIG. 8 should have a shape such as that shown in FIGS. 9(a) to 9(c); in FIG. 10(a), which is a view along arrow X in FIG. 9(a); in FIG. 10(b), which is a cross section through A-A' in FIG. 9(c); in FIG. 10(c), which is a cross section through B-B' in FIG. 9(c); in FIG. 10(d), which is a cross section through C-C' in FIG. 9(c); or in FIG. 10(e), which is a cross section through D-D' in FIG. 9(c).

Specifically, the out-of-liquid sensor 1' has the same basic structure as does the out-of-liquid sensor 1 shown in FIG. 1, with a cylindrical extension 53 and a flanged section 52 for engagement with the lid 51 provided to one end of a tubular body 2 with a mounted photosensor 3 in the manner shown in FIG. 9(a), in which identical sections are designated by the same numbers and are omitted from the description. A threaded section 54 is formed on the tip of the cylindrical extension 53, and the interior thereof is provided with a communicating section 55 for establishing communication between the internal bore section 6 of the tubular body 2 and a chemical solution suction piping 70 (see FIG. 8) formed inside the chemical solution container 50, as shown in FIG. 9(b).

The other end face of the tubular body 2 is provided with a connecting section 5 composed of an internal PT⅛-inch thread and designed to form a connection with the downstream piping 16' of the chemical solution supply line in the same manner as in the case of the out-of-liquid sensor 1, as shown in FIG. 9(b). The periphery 5a thereof is fashioned into a hexagonal prismatic shape in view of the ease with which a connection with a pipe joint can be formed, as shown in FIG. 10(d). In the figure, 60 is a guide for bringing out to the top an electric wire 12 that protrudes from the photosensor 3 (see FIG. 8) mounted in the concavity 7.

The tubular body 2 is also provided with notches 61 and 62, which are shaped differently at different locations in order to provide minimum wall thickness without making it more difficult to mount the photosensor 3, as shown in FIGS. 9(c), 10(b), and 10(c). The wall thickness is further reduced by providing a cross-shaped rib 63 to the foot section of the flanged section 52, as shown in FIGS. 10(a) and 10(e). These measures are implemented with consideration for the ease of molding of the tubular body 2 and for the ability to ensure adequate strength, a lighter weight, ease of assembly, and the like of the tubular body 2.

Figure 11:
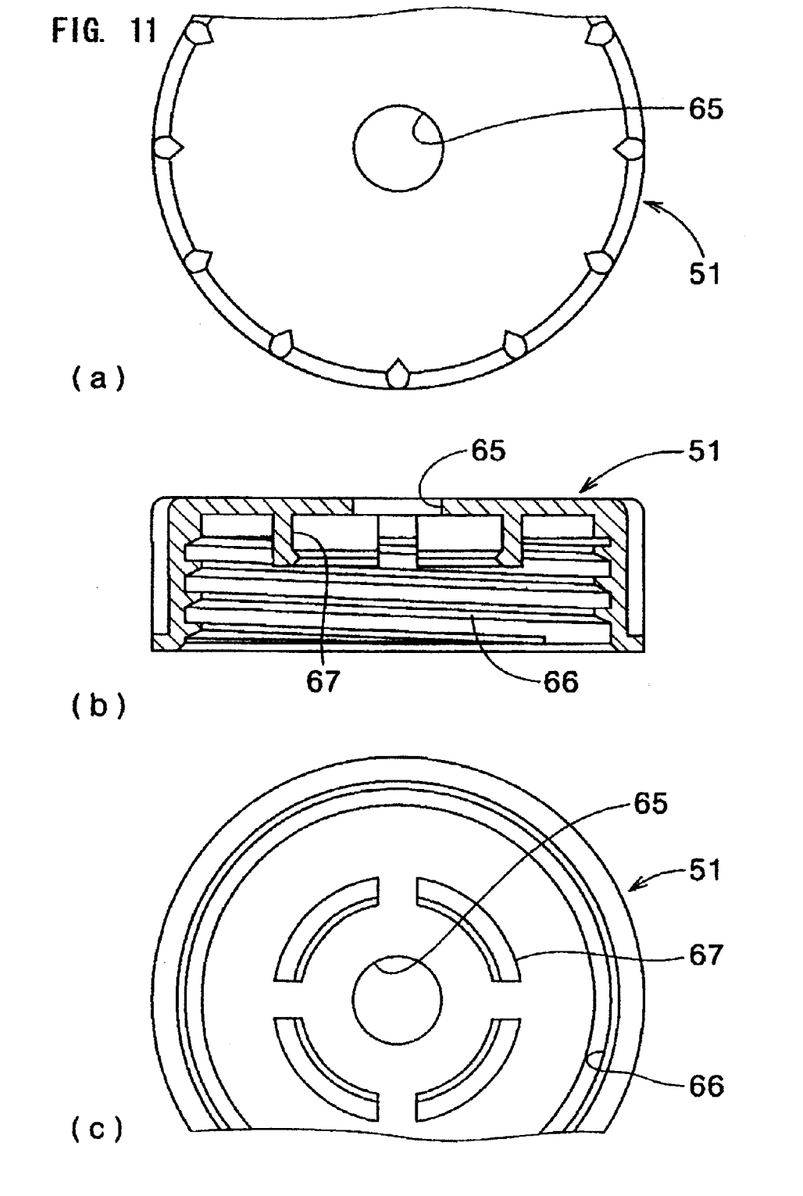
FIG. 11(a) is a plan view of the lid used in the above-mentioned other embodiment.
FIG. 11(b) is a cross section thereof.
FIG. 11(c) is a bottom view thereof.

An opening 65 sufficiently large to accommodate the cylindrical extension 53 of the out-of-liquid sensor 1' is formed in the center of the lid 51 mounting the out-of-liquid sensor 1'as shown in FIG. 11(b). FIG. 11(a) is a plan view thereof, and FIG. 11(c) is a bottom view thereof. In the figures, 66 is an internal thread provided in order to ensure screwed engagement with the male thread provided to the mouth of the chemical solution container 50, and 67 is a rib formed inside the lid 51.

Figure 12:
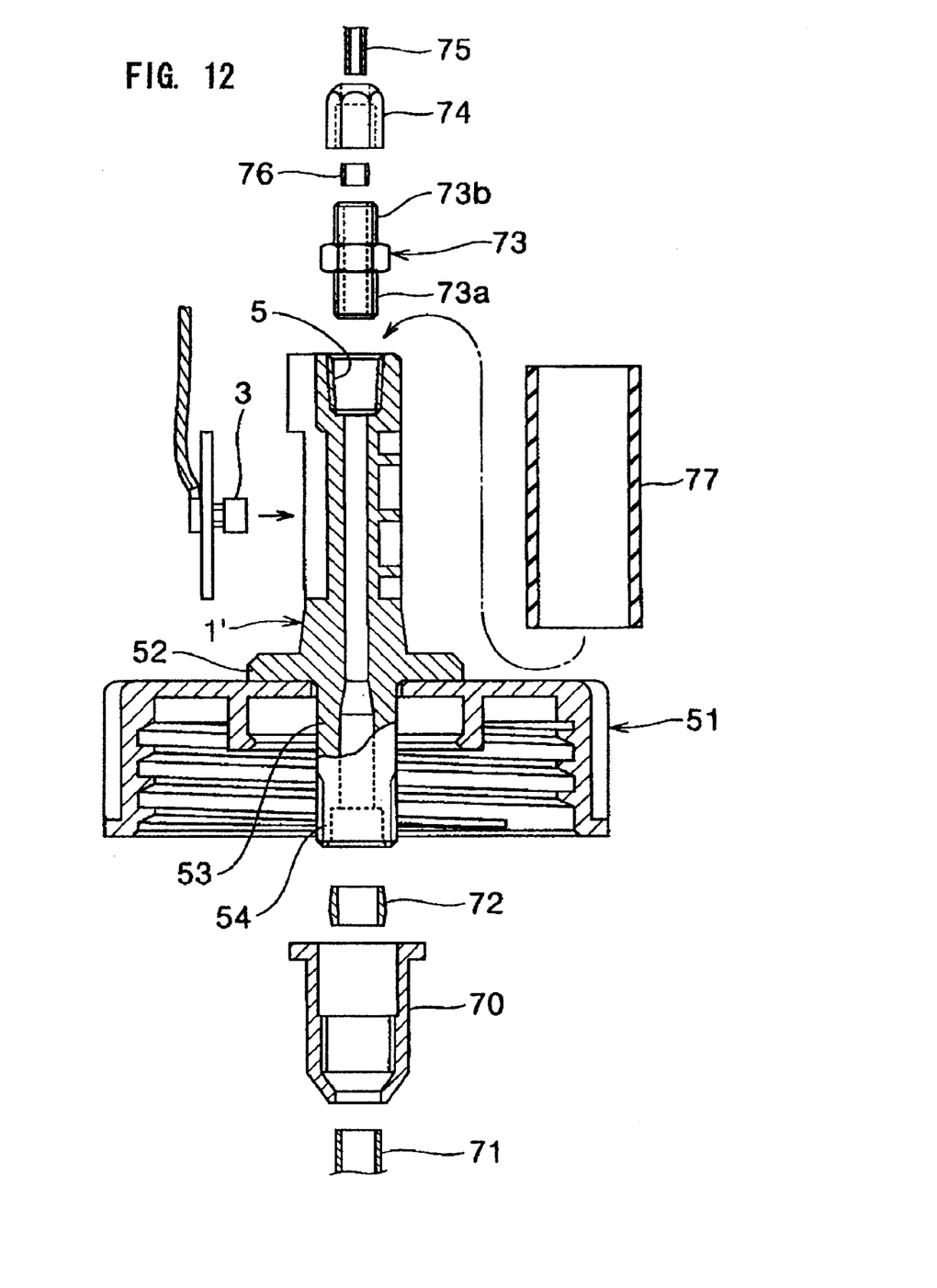
FIG. 12 is a diagram depicting the method for mounting the out-of-liquid sensor and lid in the above-mentioned other embodiment.

The out-of-liquid sensor 1' is mounted on the lid 51 in the following manner. Specifically, the cylindrical extension 53 of the out-of-liquid sensor 1' is first inserted into the opening 65 in the lid 51, and the bottom surface of the flanged section 52 is caused to engage the top surface of the lid 51, as shown in FIG. 12. A hose 71 for pumping the chemical solution is inserted into a flanged nut 70, the upper end thereof is fitted and secured in a sleeve 72, the flanged nut 70 is screwed onto the threaded section 54 of the cylindrical extension 53 of the out-of-liquid sensor 1', and the hose 71 is fastened in place. At this time, the lid 51 can be easily removed from the opening in the chemical solution container 50 during chemical solution replenishment or the like, and good working property can be achieved because the lid 51 and the flanged section 52 are fitted only loosely and the lid 51 can rotate freely.

The threaded section 73a on one side of a connector 73 is screwed and connected to the top connecting section 5 of the out-of-liquid sensor 1'. A tube 75, which serves as a chemical solution supply line, is inserted into a nut 74, and the bottom section thereof is fitted and secured in a sleeve 76. The nut 74 is screwed and fixed onto the threaded section 73b on the other side of the connector 73 connected to the out-of-liquid sensor 1'.

A state in which the out-of-liquid sensor 1' is mounted directly on the lid 51 of the chemical solution container 50 is thus achieved, as shown in FIG. 8. In this state, the out-of-liquid sensor 1' is prevented from being suspended in midair in the manner encountered when the sensor is connected to the flexible tube 75, which is a chemical solution supply line, and remains stably disposed on the lid 51, making it possible to reduce the number of instances in which malfunctions occur due to bubbles in the chemical solution. Another benefit is that the sensor is accommodated by the open space above the chemical solution container 50 and presents no obstruction to the operating environment. Furthermore, the out-of-liquid sensor 1' can be used in a satisfactory manner for a long time without becoming unsteady or coming into contact with other components.

Since the out-of-liquid sensor 1' is disposed comparatively low when used after being mounted on the chemical solution container 50 in the above-described manner, and there is a danger that the out-of-liquid sensor 1' will be affected by water or another liquid, a cylindrical cover 77 is prepared and placed around the outside of the out-of-liquid sensor 1' before the connections are made in order to protect the out-of-liquid sensor 1', as shown in FIG. 12. The cover 77 should be preferably made of a flexible and stretchable material (for example, rubber sheet or urethane sheet) that can readily conform to the outside contours of the irregular out-of-liquid sensor 1'. Using a black-colored cover 77 is particularly preferred in order to minimize the effect of external light. The voice alarm 13, LED 14, or the like (see FIG. 1) should be mounted preferably at a location separate from the tubular body 2 when the cover 77 is provided.

Although the above example was described with reference to a case in which a connector 73 with a first threaded section 73a and a second threaded section 73b formed in a 180° direction was used in order to connect the connecting section 5 of the out-of-liquid sensor 1' and the tube 75 for an upwardly protruding chemical solution supply line, it is also possible to use an elbow-type connector in which the first threaded section and the second threaded section are formed in a 90° direction for certain configurations of the out-of-liquid sensor 1'.

Figure 13:
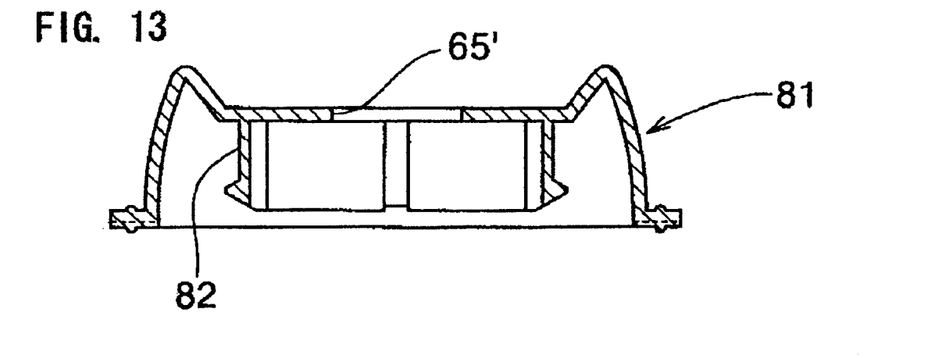
FIG. 13 is a diagram of another lid that can be used in the above-mentioned other embodiment.

Another feature of the above example is that the lid 51 mounting the out-of-liquid sensor 1' is fitted by being screwed to the opening in the chemical solution container 50, but the lid 51 may also be any other lid type. For example, the out-of-liquid sensor 1' can be mounted in a simple manner in the same way as in the above example merely by forming an opening 65' for mounting the out-of-liquid sensor 1' in the center of a one-touch lid 81 configured such that an annular rib 82 provided on the inside of the lid 81 is fitted into the opening in the chemical solution container 50, as shown in FIG. 13.

The liquid supply devices designed for use with, among other things, the out-of-liquid sensors 1 and 1' of the present invention are not subject to any particular limitations, and components other than those related to the out-of-liquid sensor functions can have any structure. Nor is the type of liquid limited in any particular way.

Thus, the out-of-liquid sensor of the present invention can therefore be used in a satisfactory manner for a long time without the detector thereof being corroded or abraded, because the detector does not come into direct contact with the liquid. In addition, detection accuracy is independent of the type of liquid being detected, making it possible to dispense with fine adjustments and other operations and to simplify the construction in comparison with conventional out-of-liquid sensors.

In addition, as since the two end sections of the sensor are provided with connecting sections for establishing connections respectively with the piping that constitutes the liquid supply route, merely by connecting appropriate connectors or the like with the connecting sections, the out-of-liquid sensor can be instantly mounted in the liquid supply route irrespective of the diameter of the piping constituting the liquid supply route, and a considerable practical effect can be achieved.

Furthermore, a liquid supply device assembled using the out-of-liquid sensor of the present invention can supply liquids in a secure manner because an out-of-liquid condition can be adequately detected for a long time without any malfunctions. High economic efficiency can be achieved because the out-of-liquid sensor can be used unchanged on liquid supply devices whose base structure is the same but whose piping diameter alone is smaller than that of the aforementioned device, merely by varying the connectors or other components used for the connecting sections.

What is claimed is:

1. An out-of-liquid sensor which is mounted in a liquid supply route for supplying a liquid to a predetermined location, and which forms a part of the liquid supply route, comprising:

a light-transmissive tubular body, the opening at one end of which is formed into a connecting section including connecting means, capable of communicating with an upstream piping of the liquid supply route, and the opening at the other end of which is formed into a connecting section including connecting means, capable of communicating with a downstream piping of the liquid supply route, and an internal bore section communicating between the two connecting sections formed in the liquid-transmitting channel; and a photosensor mounted on the tubular body;

wherein the detector of the photosensor is constructed to sense, through the light-transmissive wall surface of the tubular body, the presence or absence of a liquid flowing through the internal bore section.

2. The out-of-liquid sensor according to claim 1, wherein the photosensor is a transmissive photosensor, and the light-emitting section and light-receiving section thereof are embedded on the opposite sides of the internal bore section of the tubular body.

3. An out-of-liquid sensor which is mounted on the lid of a liquid-filled container prepared as a liquid supply source for supplying a liquid to a predetermined location, and which forms a part of a liquid supply route extending from the liquid supply source, comprising:

a light-transmissive tubular body, the opening at one end of which is formed into a connecting section including connecting means, capable of communicating with a liquid suction piping for engaging an opening formed in the lid of the liquid-filled container and drawing out the liquid in the container, and the opening at the other end of which is formed into a connecting section including connecting means, capable of communicating with a downstream piping of the liquid supply route, and an internal bore section communicating between the two connecting sections formed in the liquid-transmitting channel; and a photosensor mounted on the tubular body;

wherein the detector of the photo sensor is constructed to sense, through the light-transmissive wall surface of the tubular body, whether there is a liquid flowing through the internal bore section.

4. The out-of-liquid sensor according to claim 3, wherein the photosensor is a transmissive photosensor, and the light-emitting section and light-receiving section thereof are embedded on the opposite sides of the internal bore section of the tubular body.

5. A liquid supply device for supplying liquid to a predetermined location, comprising:

liquid delivery means for drawing a liquid from one end and discharging the liquid at the other end;

a liquid suction piping, one end of which is connected to a liquid supply source, and the other end of which is connected to the suction side of the liquid delivery means; and a liquid discharge piping, one end of which is connected to the discharge side of the liquid delivery means, and the other end of which is connected to the predetermined location;

wherein the out-of-liquid sensor according to claim 1 or 2 is mounted in the liquid suction route extending from the liquid supply source to the suction side of the liquid delivery means via the liquid suction piping, or in the liquid discharge route extending from the discharge side of the liquid delivery means to the predetermined location via the liquid discharge piping; and predetermined warning means is set to be activated when the photosensor in the out-of-liquid sensor detects an absence of liquid in the internal bore section of the tubular body.

6. A liquid supply device for supplying liquid to a predetermined location, comprising:

liquid delivery means for drawing a liquid from one end and discharging the liquid at the other end;

a liquid suction piping, one end of which is connected to a liquid-filled container prepared as a liquid supply source, and the other end of which is connected to the suction side of the liquid delivery means; and a liquid discharge piping, one end of which is connected to the discharge side of the liquid delivery means, and the other end of which is connected to the predetermined location;

wherein the out-of-liquid sensor according to claim 3 or 4 is mounted on the lid of the liquid-filled container; and predetermined warning means is set to be activated when the photosensor in the out-of-liquid sensor detects an absence of liquid in the internal bore section of the tubular body.

* * * * *